United States Patent
Dalmatov et al.

(10) Patent No.: US 10,754,573 B2
(45) Date of Patent: Aug. 25, 2020

(54) OPTIMIZED AUTO-TIERING, WHEREIN SUBSET OF DATA MOVEMENTS ARE SELECTED, UTILIZING WORKLOAD SKEW POINT, FROM A LIST THAT RANKS DATA MOVEMENTS BASED ON CRITERIA OTHER THAN I/O WORKLOAD

(71) Applicant: EMC IP Holding Company LLC, Hopkinton, MA (US)

(72) Inventors: Nickolay A. Dalmatov, Saint-Petersburg (RU); Vladimir Shatunov, Saint-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 74 days.

(21) Appl. No.: 15/423,657

(22) Filed: Feb. 3, 2017

(65) Prior Publication Data
US 2017/0262223 A1 Sep. 14, 2017

(30) Foreign Application Priority Data
Mar. 11, 2016 (RU) .................................. 016108810

(51) Int. Cl.
*G06F 3/06* (2006.01)
(52) U.S. Cl.
CPC .......... *G06F 3/0649* (2013.01); *G06F 3/0605* (2013.01); *G06F 3/0659* (2013.01); *G06F 3/0685* (2013.01)
(58) Field of Classification Search
None
See application file for complete search history.

(56) References Cited

U.S. PATENT DOCUMENTS

| 8,006,061 | B1 * | 8/2011 | Chatterjee | G06F 3/0605 711/170 |
| 8,949,483 | B1 * | 2/2015 | Martin | G06F 11/261 710/16 |
| 2002/0069280 | A1 * | 6/2002 | Bolik | G06F 16/10 709/225 |
| 2011/0202732 | A1 * | 8/2011 | Montgomery | G06F 3/061 711/154 |
| 2012/0303917 | A1 * | 11/2012 | Chiu | G06F 16/13 711/165 |

(Continued)

*Primary Examiner* — William B Partridge
*Assistant Examiner* — Chie Yew
(74) *Attorney, Agent, or Firm* — Muirhead and Saturnelli, LLC

(57) ABSTRACT

Described are techniques for performing data movement optimization processing comprising: receiving a list of proposed data movements; ranking the list in accordance with one or more criteria associated with each of the proposed data movements of the list, wherein the one or more criteria for each proposed data movement, that moves a data portion to a target storage tier, includes at least one characteristic about each proposed data movement other than I/O workload directed to the data portion; selecting a subset of the proposed data movements of the list; implementing the subset of the proposed data movements by performing each of the proposed data movements of the subset; and revising the list to remove proposed data movements of the subset implemented in said implementing. A new list may be obtained each time period. A subset of the ranked list may be implemented each time period in a cycle.

20 Claims, 12 Drawing Sheets

(56) References Cited

U.S. PATENT DOCUMENTS

| | | | |
|---|---|---|---|
| 2013/0132638 A1* | 5/2013 | Horn | G06F 12/0871 |
| | | | 711/103 |
| 2013/0290598 A1* | 10/2013 | Fiske | G06F 3/0625 |
| | | | 711/103 |
| 2014/0181425 A1* | 6/2014 | Ashida | G06F 3/0686 |
| | | | 711/153 |
| 2014/0297926 A1* | 10/2014 | Ono | G06F 3/0688 |
| | | | 711/103 |
| 2015/0149605 A1* | 5/2015 | de la Iglesia | H04L 67/322 |
| | | | 709/223 |
| 2016/0132266 A1* | 5/2016 | Greenfield | G06F 9/5016 |
| | | | 711/170 |
| 2016/0132433 A1* | 5/2016 | Hayashi | G06F 12/0866 |
| | | | 711/118 |
| 2017/0242627 A1* | 8/2017 | Mills | G06F 11/1076 |

* cited by examiner

List of proposed data movements 310

| | File system metadata 312 | Application critical 314 | I/O workload 316 | Slice ID 318 |
|---|---|---|---|---|
| DM1 320a | Yes | No | X1 IOs per second | A1 |
| DM2 320b | Yes | No | X2 IOs per second | A2 |
| DM3 320c | No | Yes | X3 IOs per second | A3 |
| DM4 320d | No | Yes | X4 IOs per second | A4 |
| DM5 320e | No | No | X5 IOs per second | A5 |
| DM6 320f | No | No | X6 IOs per second | A6 |
| DM7 320g | | | X7 IOs per second | A7 |

List of proposed data movements 410

| | Primary criteria A 412 | Primary criteria B 414 | Primary Criteria C 415 | I/O workload 416 | Slice ID 418 |
|---|---|---|---|---|---|
| DM1 420a | Yes | Yes | Yes | X1 IOs per second | A1 |
| DM2 420b | Yes | Yes | No | X2 IOs per second | A2 |
| DM3 420c | Yes | No | Yes | X3 IOs per second | A3 |
| DM4 420d | No | Yes | Yes | X4 IOs per second | A4 |
| DM5 420e | No | No | No | X5 IOs per second | A5 |
| DM6 420f | No | No | No | X6 IOs per second | A6 |
| DM7 420g | No | No | No | X7 IOs per second | A7 |

FIG. 5

List of proposed data movements 510

| | Application priority 512 | QOS 514 | I/O workload 516 | Slice ID 518 |
|---|---|---|---|---|
| DM1 520a | 1 | 1 | X1 IOs per second | A1 |
| DM2 520b | 1 | 2 | X2 IOs per second | A2 |
| DM3 520c | 2 | 1 | X3 IOs per second | A3 |
| DM4 520d | 2 | 1 | X4 IOs per second | A4 |
| DM5 520e | 3 | 1 | X5 IOs per second | A5 |
| DM6 520f | 3 | 2 | X6 IOs per second | A6 |
| DM7 520g | 3 | 3 | X7 IOs per second | A7 |

OPTIMIZED AUTO-TIERING, WHEREIN SUBSET OF DATA MOVEMENTS ARE SELECTED, UTILIZING WORKLOAD SKEW POINT, FROM A LIST THAT RANKS DATA MOVEMENTS BASED ON CRITERIA OTHER THAN I/O WORKLOAD

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is method of performing data movement optimization processing comprising: receiving a list of proposed data movements; ranking the list of proposed data movements in accordance with one or more criteria associated with each of the proposed data movements of the list, wherein the one or more criteria for said each proposed data movement, that moves a data portion to a target storage tier, includes at least one characteristic about said each proposed data movement other than I/O workload directed to the data portion; selecting, in accordance with said ranking, a subset of the proposed data movements of the list; implementing the subset of the proposed data movements by performing each of the proposed data movements of the subset; and revising the list to remove proposed data movements of the subset implemented in said implementing. The target storage tier may be one of a plurality of storage tiers, and wherein the plurality of storage tiers may be ranked based on relative performance. The list of proposed data movements may be generated by a data storage optimizer that automatically generates a new list of proposed data movements at each occurrence of a defined time period. The steps of ranking, selecting, implementing and revising are repeated as a group at each occurrence of a defined time period within a cycle having a defined cycle time that is a multiple of the defined time period. The one or more criteria may include one or more primary criteria and one or more secondary criteria. The one or more criteria may include a third level of criteria. The one or more criteria for each proposed data movement, that moves the data portion to the target storage tier, may include an indicator denoting whether the data portion includes file system metadata. The one or more criteria for each proposed data movement, that moves the data portion to the target storage tier, may include an indicator denoting whether the data portion includes application critical data. The one or more criteria for each proposed data movement, that moves the data portion to the target storage tier, may include an I/O workload for the data portion. The I/O workload for the data portion may denote a cumulative I/O workload directed to the data portion for both reads and writes directed to the data portion. The one or more criteria for each proposed data movement, that moves the data portion to the target storage tier, may include one of a predefined set of application priorities denoting an application priority for an application using the data included in the data portion of each proposed data movement. The one or more criteria for each proposed data movement, that moves the data portion to the target storage tier, may include one of a predefined set of quality of serve levels denoting a priority or level of importance of the data portion of each proposed data movement, wherein the priority or level of importance may be with respect to an application using the data included in the data portion of each proposed data movement. The target tier may be one of a plurality of storage tiers. A first of the plurality of storage tiers may include physical storage devices having a first write endurance and a second of the plurality of storage tiers may include physical storage devices having a second write endurance greater than the first write endurance. The first endurance may denote that physical storage devices of the first storage tier wear out and are expected to sustain an expected number of write or erasure cycles that is less than a second expected number of write or erasure cycles associated with physical devices of the second storage tier. The first and the second storage tiers are tiers may be of different flash-based physical drives. The the one or more criteria for each proposed data movement, that moves the data portion to the target storage tier, may include an indicator denoting whether I/O workload directed to the data portion is read heavy or write heavy. A number of proposed data movements included in the subset may be determined using any of: a predetermined quantity of proposed data movements, a predetermined percentage denoting a percentage of proposed data movements from the list, a time limit where the number denotes an amount of proposed data movements performed during an amount of time denoted by the time limit, a specified threshold level of performance, and a specified increase or benefit in performance.

In accordance with another aspect of techniques herein is a system comprising: a processor; and a memory comprising code stored thereon that, when executed, performs a method comprising: receiving a list of proposed data movements; ranking the list of proposed data movements in accordance with one or more criteria associated with each of the proposed data movements of the list, wherein the one or more criteria for said each proposed data movement, that moves a data portion to a target storage tier, includes at least one characteristic about said each proposed data movement other than I/O workload directed to the data portion; selecting, in accordance with said ranking, a subset of the proposed data movements of the list; implementing the subset of the proposed data movements by performing each of the proposed data movements of the subset; and revising the list to remove proposed data movements of the subset implemented in said implementing.

In accordance with another aspect of techniques herein is a computer readable medium comprising code stored thereon, that when executed, performs a method of data movement optimization processing comprising: receiving a list of proposed data movements; ranking the list of proposed data movements in accordance with one or more criteria associated with each of the proposed data movements of the list, wherein the one or more criteria for said each proposed data movement, that moves a data portion to a target storage tier, includes at least one characteristic about said each proposed data movement other than I/O workload directed to the data portion; selecting, in accordance with said ranking, a subset of the proposed data movements of the list; implementing the subset of the proposed data movements by performing each of the proposed data movements of the subset; and revising the list to remove proposed data movements of the subset implemented in said implementing. The subset may include a highest ranked portion of proposed data movements on the list. The revising step may output a revised list of proposed data movements in which the subset implemented have been removed. After performing said revising, the method may further include performing: receiving an on-demand request to perform data movements; and responsive to receiving the on-demand request, implementing the revised list of proposed data movements.

BRIEF DESCRIPTION OF THE DRAWINGS

Features and advantages of the present invention will become more apparent from the following detailed description of exemplary embodiments thereof taken in conjunction with the accompanying drawings in which:

FIG. 3 is an example illustrating data and software components that may be used in an embodiment in accordance with techniques herein.

FIGS. 4, 5 and 6 are examples illustrating different criteria that may be used in connection with ranking a list of proposed data movements of slices in an embodiment in accordance with techniques herein;

DETAILED DESCRIPTION OF EMBODIMENT(S)

Figure 1:
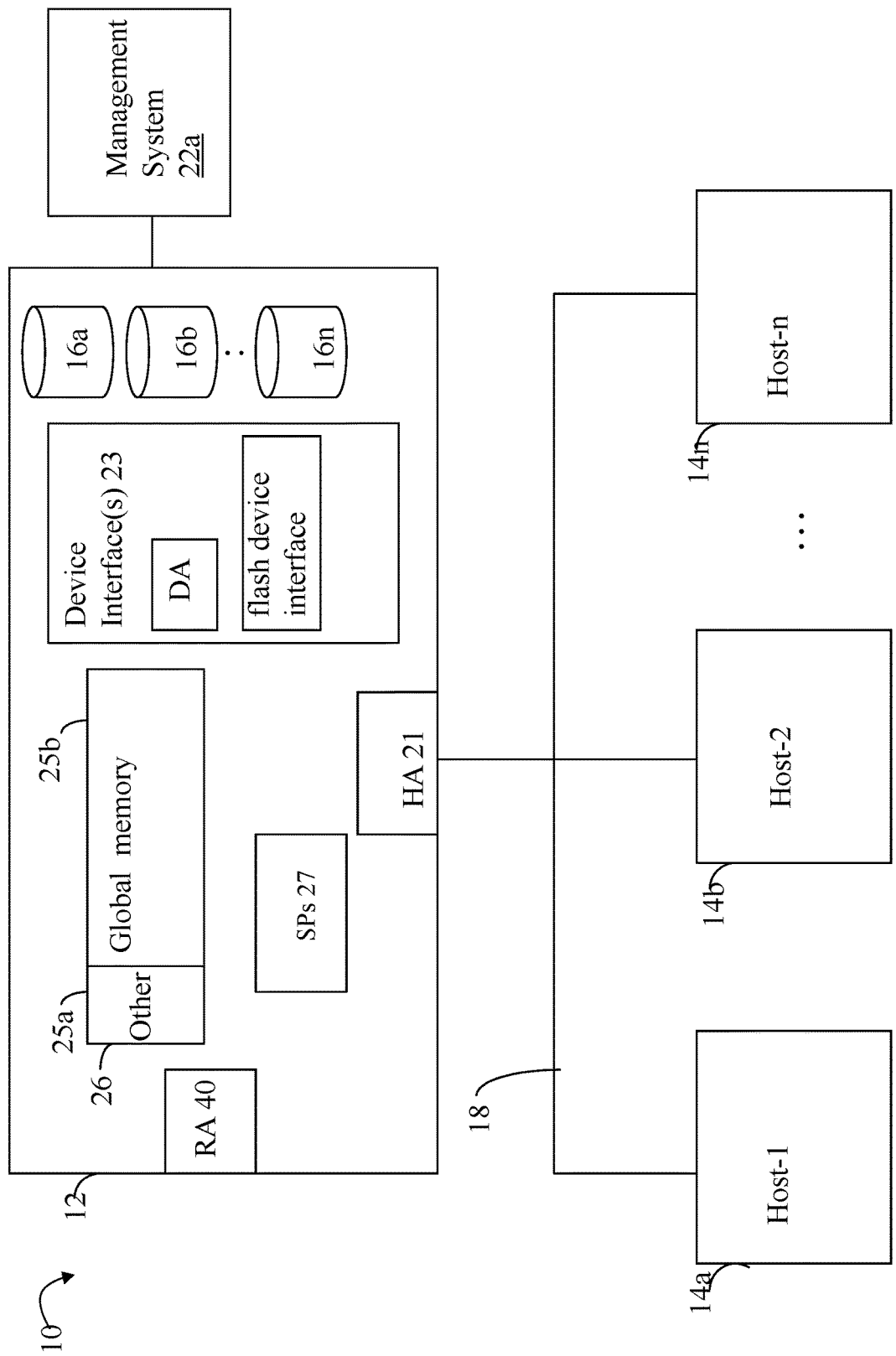
FIGS. 1 and 3 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software such as may execute in a web browser. A data storage system manager may, for example, view information about a current data storage configuration such as LUNs, storage pools, and the like, on a user interface (UI) in display device of the management system 22a.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID (Redundant Array of Independent Disks) group configuration, storage capacity, and the like. RAID groups are known in the art. The PDs of each RAID group may have a particular RAID level (e.g., RAID-1, RAID-5 3+1, RAID-5 7+1, and the like) providing different levels of data protection. For example, RAID-1 is a group of PDs configured to provide data mirroring where each data portion is mirrored or stored on 2 PDs of the RAID-1 group. The storage type or technology may specify whether a physical storage device is an SSD (solid state drive) drive (such as a flash drive), a particular type of SSD drive (such using flash memory or a form of RAM), a type of rotating magnetic disk or other non-SSD drive (such as a 10K RPM rotating disk drive, a 15K RPM rotating disk drive), and the like. Performance characteristics may relate to different performance aspects of the physical storage devices of a particular type or technology. For example, there may be multiple types of rotating disk drives based on the RPM characteristics of the disk drives where disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein that is a multi-tiered storage system may define two storage tiers including a first tier of all SSD drives and a second tier of all non-SSD drives. As another example, an embodiment in accordance with techniques herein that is a multi-tiered storage system may define three storage tiers including a first tier of all SSD drives which are flash drives, a second tier of all 15K RPM rotating disk drives, and a third tier of all 10K RPM rotating disk drives. In terms of general expected performance, the SSD or flash tier may be considered the highest performing tier. The second tier of 15K RPM disk drives may be considered the second or next highest performing tier and the 10K RPM disk drives may be considered the lowest or third ranked tier in terms of expected performance. The foregoing are some examples of tier definitions and other tier definitions may be specified and used in an embodiment in accordance with techniques herein.

Figure 2A:
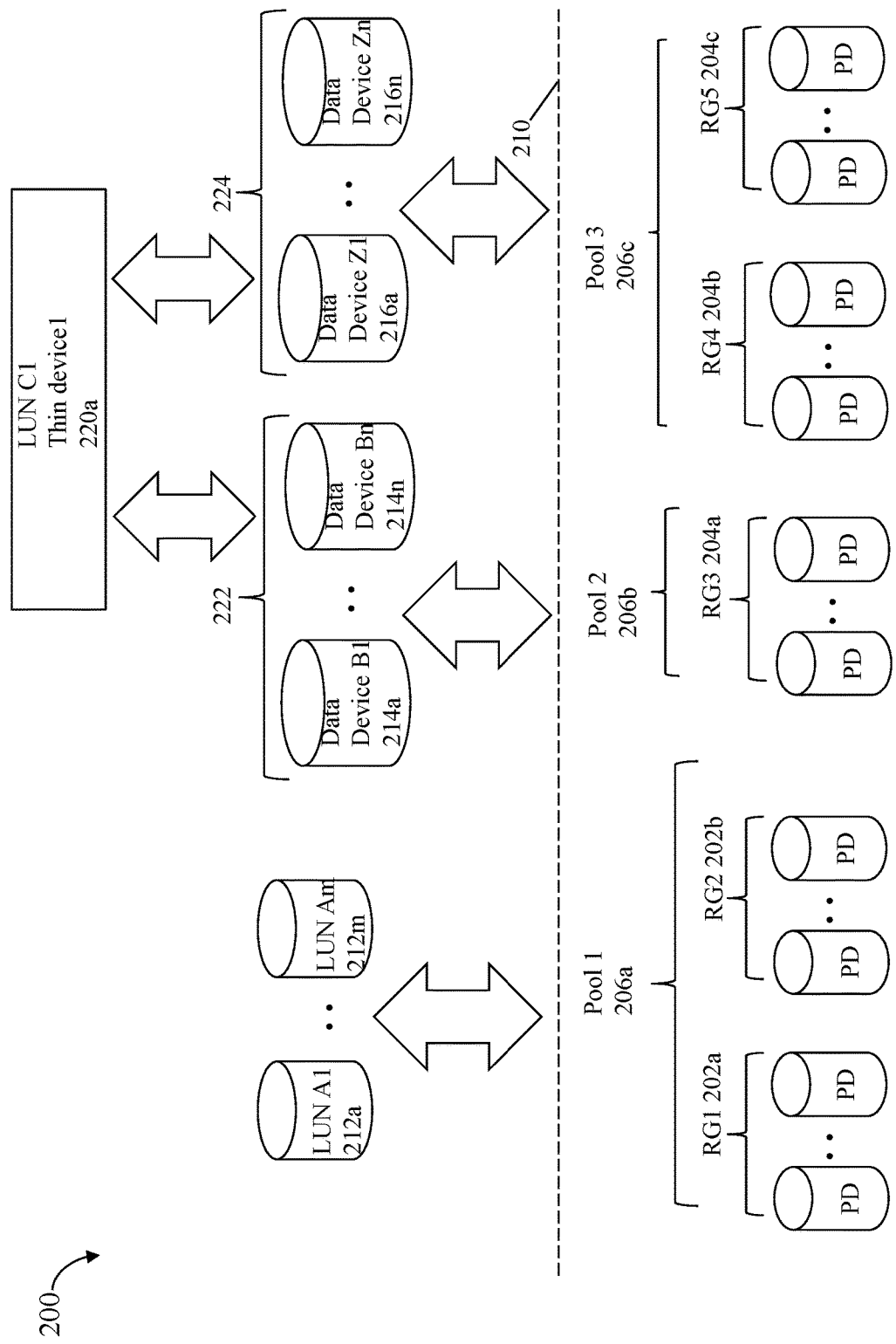
FIG. 2A is an example illustrating physical and logical views of entities in connection with storage in an embodiment in accordance with techniques herein.

In a data storage system in an embodiment in accordance with techniques herein, PDs may be configured into a pool or group of physical storage devices where the data storage system may include many such pools of PDs such as illustrated in FIG. 2A. Each pool may include one or more configured RAID groups of PDs.

Depending on the particular embodiment, each pool may also include only PDs of the same storage tier with the same type or technology, or may alternatively include PDs of different storage tiers with different types or technologies.

With reference to FIG. 2A, a first pool, pool 1 206a, may include two RAID groups (RGs) of 10K RPM rotating disk drives of a first storage tier. The foregoing two RGs are denoted as RG1 202a and RG2 202b. A second pool, pool 2 206b, may include 1 RG (denoted RG3 204a) of 15K RPM disk drives of a second storage tier of PDs having a higher relative performance ranking than the first storage tier of 10K RPM drives. A third pool, pool 3 206c, may include 2 RGs (denoted RG 4 204b and RG 5 204c) each of which includes only flash-based drives of a third highest performance storage tier of PDs having a higher relative performance ranking than both the above-noted first storage tier of 10K RPM drives and second storage tier of 15K RPM drives.

The components illustrated in the example 200 below the line 210 may be characterized as providing a physical view of storage in the data storage system and the components illustrated in the example 200 above the line 210 may be characterized as providing a logical view of storage in the data storage system. The pools 206a-c of the physical view of storage may be further configured into one or more logical entities, such as LUNs or more generally, logical devices. For example, LUNs 212a-m may be thick or regular logical devices/LUNs configured or having storage provisioned, from pool 1 206a. LUN 220a may be a virtually provisioned logical device, also referred to as a virtually provisioned LUN, thin device or thin LUN, having physical storage configured from pools 206b and 206c. A thin or virtually provisioned device is described in more detail in following paragraphs and is another type of logical device that may be supported in an embodiment of a data storage system in accordance with techniques herein.

Generally, a data storage system may support one or more different types of logical devices presented as LUNs to clients, such as hosts. For example, a data storage system may provide for configuration of thick or regular LUNs and also virtually provisioned or thin LUNs, as mentioned above. A thick or regular LUN is a logical device that, when configured to have a total usable capacity such as presented to a user for storing data, has all the physical storage provisioned for the total usable capacity. In contrast, a thin or virtually provisioned LUN having a total usable capacity (e.g., a total logical capacity as published or presented to a user) is one where physical storage may be provisioned on demand, for example, as data is written to different portions of the LUN's logical address space. Thus, at any point in time, a thin or virtually provisioned LUN having a total usable capacity may not have an amount of physical storage provisioned for the total usable capacity. The granularity or the amount of storage provisioned at a time for virtually provisioned LUN may vary with embodiment. In one embodiment, physical storage may be allocated, such as a single allocation unit of storage, the first time there is a write to a particular target logical address (e.g., LUN and location or offset on the LUN). The single allocation unit of physical storage may be larger than the size of the amount of data written and the single allocation unit of physical storage is then mapped to a corresponding portion of the logical address range of a LUN. The corresponding portion of the logical address range includes the target logical address. Thus, at any point in time, not all portions of the logical address space of a virtually provisioned device may be associated or mapped to allocated physical storage depending on which logical addresses of the virtually provisioned LUN have been written to at a point in time.

In one embodiment, a thin device may be implemented as a first logical device, such as 220a, mapped to portions of one or more second logical devices, also referred to as data devices. Each of the data devices may be subsequently mapped to physical storage of underlying storage pools. For example, portions of thin device 220a may be mapped to corresponding portions in one or more data devices of the first group 222 and/or one or more data devices 216a-n of the second group 224. Data devices 214a-n may have physical storage provisioned in a manner like thick or regular LUNs from pool 206b. Data devices 216a-n may have physical storage provisioned in a manner like thick or regular LUNs (e.g., similar to LUNs A1-Am 212a-212m) from pool 206c. Thus, portions of thin device 220a mapped to data devices of 222 have their data stored on 15K RPM PDs of pool 206b, and other portions of thin device 220a mapped to data devices of 224 have their data stored on flash PDs of pool 206c. In this manner, storage for different portions of thin device 220a may be provisioned from multiple storage tiers.

In at least one embodiment as described herein, the particular storage tier upon which a data portion of a thin device is stored may vary with the I/O workload directed to that particular data portion. For example, a first data portion of thin device 220a having a high I/O workload may be stored on a PD of pool 206c by mapping the first logical address of the first data portion in the thin LUN's address space to a second logical address on a data device in 224. In turn the second logical address of the data device in 224 may be mapped to physical storage of pool 206c. A second data portion of thin device 220a having a lower I/O workload than the first data portion may be stored on a PD of pool 206b by mapping the third logical address of the second data portion in the thin LUN's address space to a fourth logical address on a data device in 222. In turn the fourth logical address of the data device in 222 may be mapped to physical storage of pool 206b. As the I/O workload of the foregoing two data portions of thin device 220a may vary, the data portions may be relocated to a different storage tier. For example, if the workload of the second data portion greatly increases at a later point in time, the second data portion may be relocated or moved to pool 206c by mapping its corresponding third logical address in the thin device 220a's address space to a fifth logical address of a data device in 224 where the fifth logical address is mapped to physical storage on pool 206c. The foregoing is described in more detail elsewhere herein.

In some embodiments, the data devices of 222 and 224 may not be directly usable (visible) to hosts coupled to a data storage system. Each of the data devices may correspond to one or more portions (including a whole portion) of one or more of the underlying physical devices. As noted above, the data devices 222 and 224 may be designated as corresponding to different performance classes or storage tiers, so that different ones of the data devices of 222 and 224 correspond to different physical storage having different relative access speeds and/or different RAID protection type (or some other relevant distinguishing characteristic or combination of characteristics), as further discussed elsewhere herein.

Figure 2B:
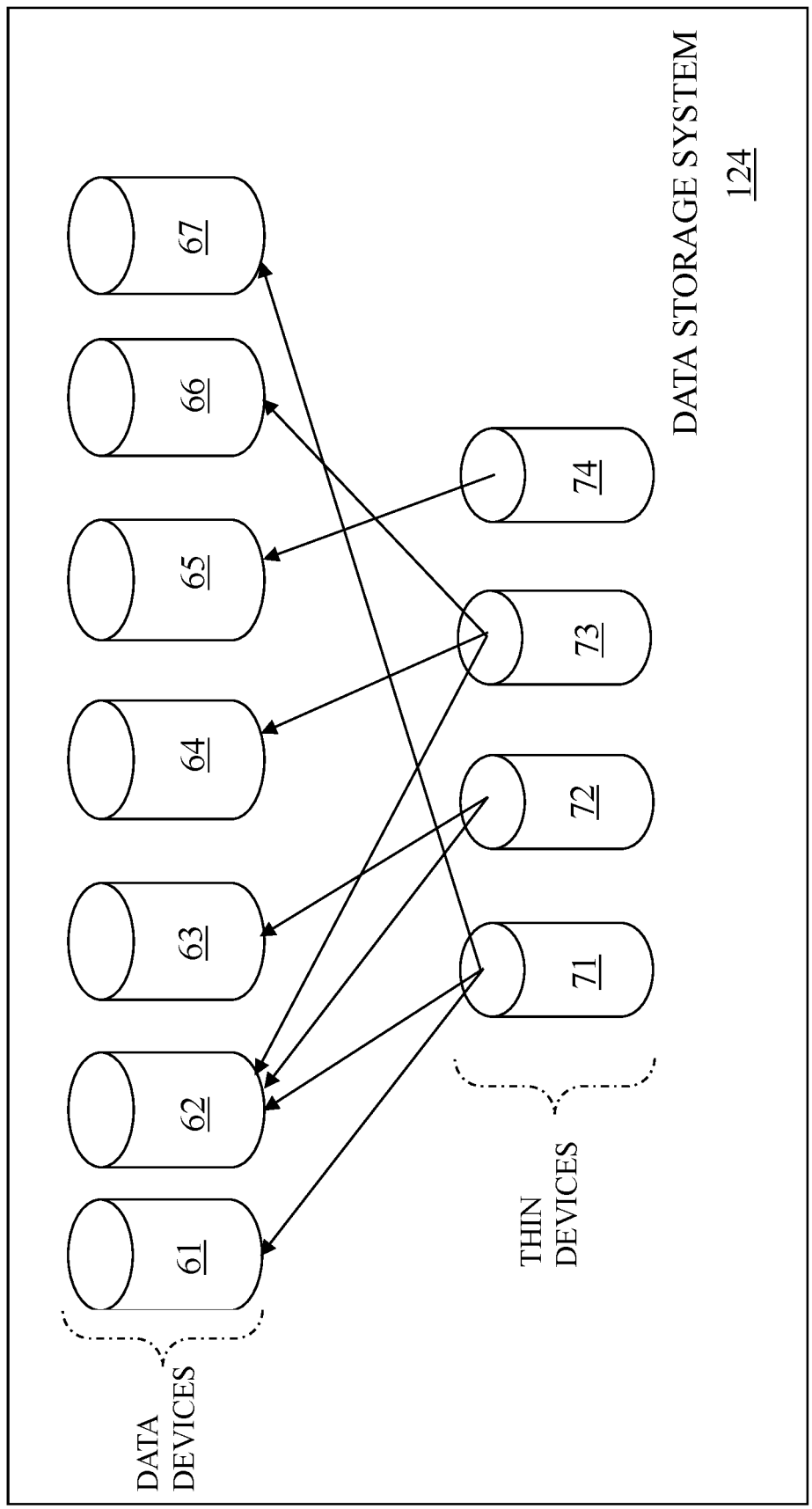
FIGS. 2B, 2C and 2D are examples illustrating aspects of implement thin or virtually provisioned logical devices in an embodiment in accordance with techniques herein.

As shown in FIG. 2B, the data storage system 124 may also include a plurality of thin devices 71-74 that may be adapted for use in connection with the system described herein when using thin provisioning. Consistent with discussion elsewhere herein, in a system using thin provisioning, the thin devices 71-74 may appear to a host coupled to the storage system 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage for a thin device presented to a host as having a particular capacity is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated.

Figure 2C:
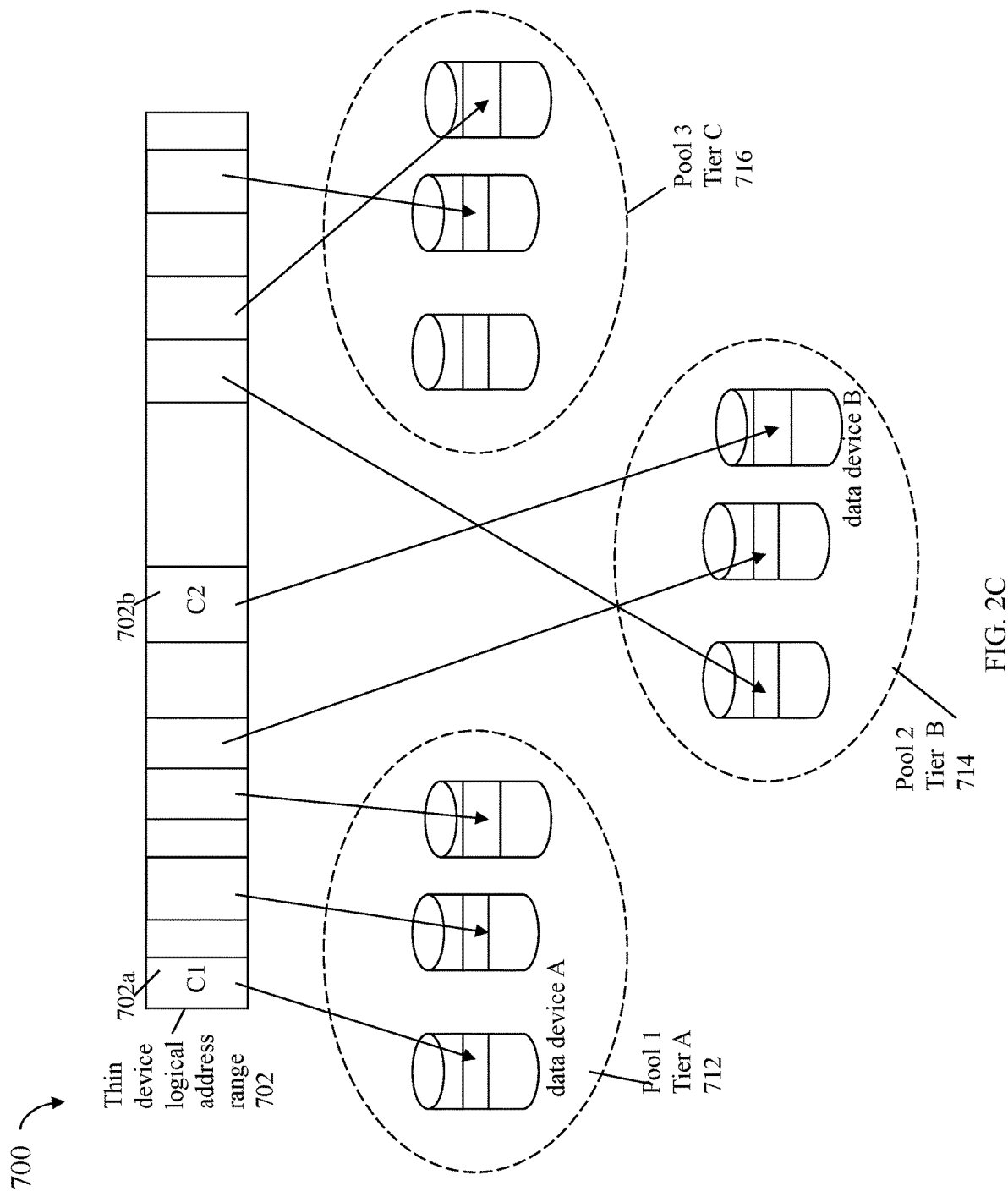

Referring to FIG. 2C, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of 15K RPM storage devices, and pool 716 may represent a storage pool of tier C of 10K RPM storage devices. Each storage pool may include a plurality of logical devices which are data devices mapped to the pool's underlying physical devices (or portions thereof). Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Figure 2D:
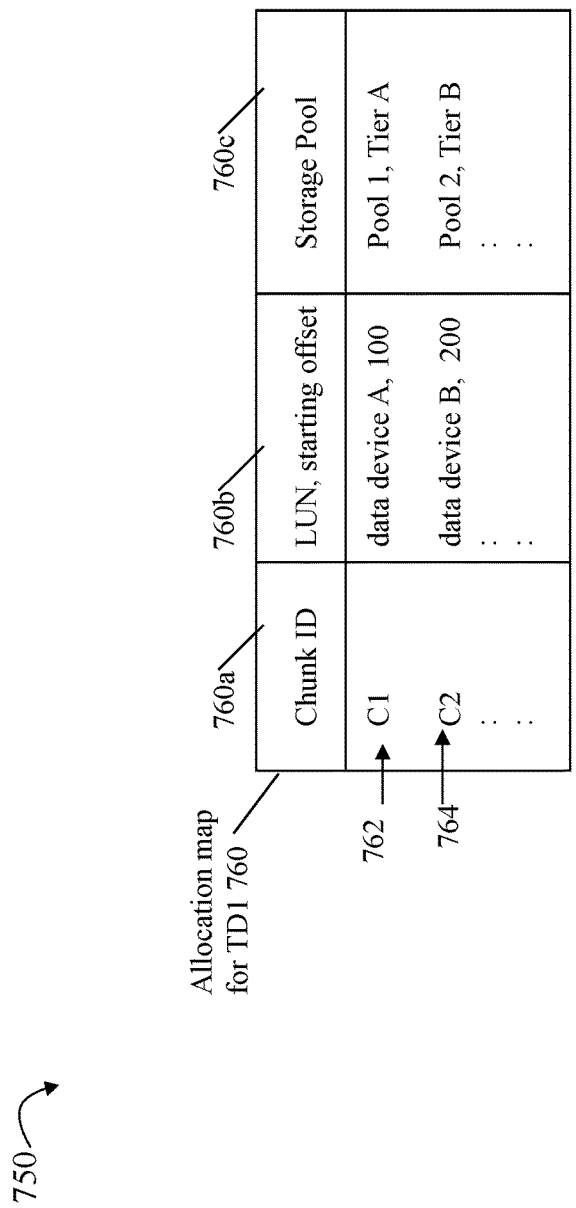

Referring to FIG. 2D, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 2C such as in connection the mapping of 702 to different storage pool devices. The allocation map 760 may contain an entry for each chunk and identify which data device and associated physical storage is mapped to the chunk. For each entry or row of the map 760 corresponding to a chunk, a first column 760a, Chunk ID, denotes an identifier to uniquely identify the chunk of the TD, a second column 760b, indicates information about the data device and offset to which the chunk is mapped, and a third column storage pool 760c denotes the storage pool and tier including the data device of 760b. For example, entry 762 represents chunk C1 illustrated in FIG. 2C as 702a and entry 764 represents chunk C2 illustrated in FIG. 2C as 702b. It should be noted that although not illustrated, the allocation map may include or otherwise use other tables and structures which identify a further mapping for each data device such as which physical device locations map to which data devices. This further mapping for each data device is described and illustrated elsewhere herein. Such information as illustrated and described in connection with FIG. 2D may be maintained for each thin device in an embodiment in accordance with techniques herein.

Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

Figure 3:
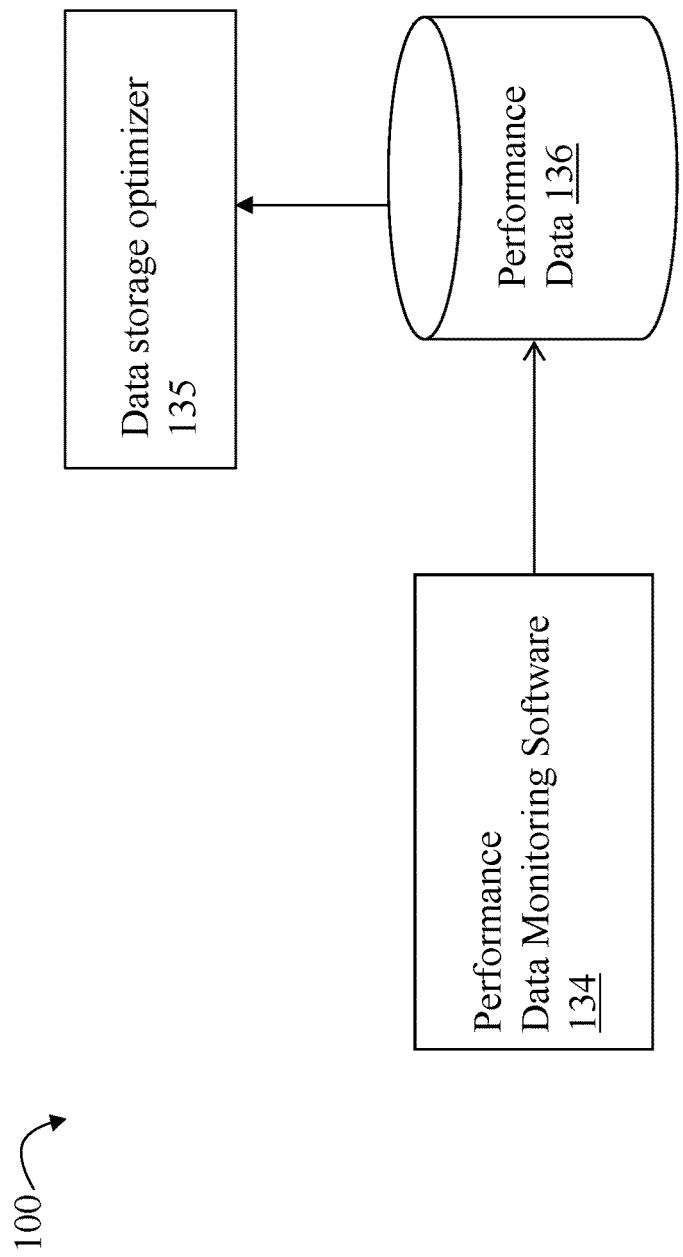

Referring to FIG. 3, shown is an example 100 of components that may be used in an embodiment in connection with techniques herein. The example 100 includes performance data monitoring software 134 which gathers performance data about the data storage system. The software 134 may gather and store performance data 136. This performance data 136 may also serve as an input to other software, such as used by the data storage optimizer 135 in connection with performing data storage system optimizations, which attempt to enhance the performance of I/O operations, such as those I/O operations associated with data storage devices 16a-16n of the system 12 (as in FIG. 1). For example, the performance data 136 may be used by a data storage optimizer 135 in an embodiment in accordance with techniques herein. The performance data 136 may be used in determining and/or optimizing one or more statistics or metrics such as may be related to, for example, an I/O workload for one or more physical devices, a pool or group of physical devices, logical devices or volumes (e.g., LUNs), thin or virtually provisioned devices (described in more detail elsewhere herein), portions of thin devices, and the like. The I/O workload may also be a measurement or level of "how busy" a device is, for example, in terms of I/O operations (e.g., I/O throughput such as number of I/Os/second, response time (RT), and the like). Examples of workload information and other information that may be obtained and used in an embodiment in accordance with techniques herein are described in more detail elsewhere herein.

In one embodiment in accordance with techniques herein, components of FIG. 3, such as the performance monitoring software 134, performance data 136 and/or data storage optimizer 135, may be located and execute on a system or processor that is external to the data storage system. As an alternative or in addition to having one or more components execute on a processor, system or component external to the data storage system, one or more of the foregoing components may be located and execute on a processor of the data storage system itself.

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the back-end (e.g., physical device) operations of read and write with respect to a LUN, thin device, and the like, may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular type of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read cache miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes (or more generally I/O operations), may refer to the read and write requests or commands performed by the DA. Such read and write commands may correspond, respectively, to physical device accesses such as disk reads and writes that may result from a host I/O request received by an HA 21.

The optimizer 135 may perform processing to determine how to allocate or partition physical storage in a multi-tiered environment for use by multiple applications. The optimizer 135 may perform processing such as, for example, to determine what particular portions of LUNs, such as thin devices, to store on physical devices of a particular tier, evaluate when to move data between physical drives of different tiers, and the like. Such data portions of a thin device may be automatically placed in a storage tier. The data portions may also be automatically relocated or moved to a different storage tier as the I/O workload and observed performance characteristics for the data portions change over time. In accordance with techniques herein, analysis of I/O workload for data portions of thin devices may be performed in order to determine whether particular data portions should have their data contents stored on physical devices located in a particular storage tier. It should be noted that the optimizer 135 may generally represent one or more components that perform processing as described herein as well as one or more other optimizations and other processing that may be performed in an embodiment.

Promotion may refer to movement of data from a source storage tier to a target storage tier where the target storage tier is characterized as having devices of higher performance than devices of the source storage tier. For example movement of data from a tier of 10K RPM drives to a tier of flash drives may be characterized as a promotion and may be performed when the I/O workload directed to the relocated data increases. Demotion may refer generally to movement of data from a source storage tier to a target storage tier where the source storage tier is characterized as having devices of higher performance than devices of the target storage tier. For example movement of data from a tier of flash drives to a tier of 10K RPM drives may be characterized as a demotion and may be performed when the I/O workload directed to the relocated data decreases.

The data storage optimizer in an embodiment in accordance with techniques herein may perform data movement optimizations generally based on any one or more data movement criteria. For example, in a system including 3 storage tiers with tier 1 of flash drives, tier 2 of 15K RPM disk drives and tier 3 of 10K RPM disk drives, the criteria may include identifying and placing at least some of the busiest data portions having the highest I/O workload on the highest performance storage tier, such as tier 1—the tier flash-based—in the multi-tiered storage system. The data movement criteria may include identifying and placing at least some of the coldest/most inactive data portions having the lowest I/O workload on the lowest or lower performance storage tier(s), such as any of tiers 2 and tier 3. For example, data portions may be ranked, in terms of I/O workload, from highest to lowest. The ranked data portions may be placed in tiers, from highest to lowest, in accordance with the ranking whereby the highest performance tier includes those data portions having the highest I/O workload. In a similar manner, tier 2-the second ranked storage tier (in terms of performance)—may be filled with the next highest ranked data portions. Finally, the data portions having the lowest I/O workload of all data portions considered for placement by the data storage optimizer may be placed on the lowest performance tier, tier 3.

As another example, the data movement criteria may include maintaining or meeting specified service level objectives (SLOs). An SLO may define one or more performance criteria or goals to be met with respect to a set of one or more LUNs where the set of LUNs may be associated, for example, with an application, a customer, a host or other client, and the like. For example, an SLO may specify that the average I/O RT (such as measured from the front end or HA of the data storage system) should be less than 5 milliseconds (ms.). Accordingly, the data storage optimizer may perform one or more data movements for a particular LUN of the set depending on whether the SLO for the set of LUNs is currently met. For example, if the average observed I/O RT for the set of one or more LUNs is 6 ms. the data storage optimizer may perform one or more data movements to relocate data portion(s) of any of the LUNs, such as currently located in tier 3, to a higher performance storage tier, such as tier 1. Data portions of a LUN may be initially placed or located in a storage tier based on an initial placement or allocation policy. Subsequently, as data operations are performed with respect to the different data portions and I/O workload data collected, data portions may be automatically relocated or placed in different storage tiers having different performance characteristics as the observed I/O workload or activity of the data portions change over time. In such an embodiment using the data storage optimizer, it may be beneficial to identify which data portions currently are hot (active or having high I/O workload or high level of I/O activity) and which data portions are cold (inactive or idle with respect to I/O workload or activity). Identifying hot data portions may be useful, for example, to determine data movement candidates to be relocated to another storage tier. For example, if trying to improve performance because and SLO is violated, it may be desirable to relocate or move a hot data portion of a LUN currently stored on a low performance tier to a higher performance tier to increase overall performance for the LUN.

An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, Attorney docket no. EMS-446US/EMC-10-368CIP1, which is incorporated by reference herein.

In at least one embodiment in accordance with techniques herein, one or more I/O statistics may be observed and collected for individual partitions, or slices of each LUN, such as each thin or virtually provisioned LUN. The logical address space of each LUN may be divided into partitions each of which corresponds to a subrange of the LUN's logical address space. Thus, I/O statistics may be maintained for individual partitions or slices of each LUN where each such partition or slice is of a particular size and maps to a corresponding subrange of the LUN's logical address space.

An embodiment may have different size granularities or units. For example, consider a case for a thin LUN having a first logical address space where I/O statistics may be maintained for a first slice having a corresponding logical address subrange of the first logical address space. The embodiment may allocate physical storage for thin LUNs in allocation units referred to as chunks. In some cases, there may be multiple chunks in a single slice (e.g. where each chunk may be less than the size of a slice for which I/O statistics are maintained). Thus, the entire corresponding logical address subrange of the first slice may not be mapped to allocated physical storage depending on what logical addresses of the thin LUN have been written to. Additionally, the embodiment may perform data movement or relocation optimizations based on a data movement size granularity. In at least one embodiment, the data movement size granularity or unit may be the same as the size of a slice for which I/O statistics are maintained and collected.

In at least one embodiment of a data storage system using techniques described herein, a fixed size slice may be used for each LUN's logical address space. For example, the size of each slice may be 256 megabytes (MB) thereby denoting that I/O statistics are collected for each 256 MB portion of logical address space and where data movement optimizations are performed which relocate or move data portions which are 256 MB in size. In such an embodiment, data may be allocated for thin devices in chunks where, generally, the size of a slice is some integer multiple of a chunk (e.g., there may be one or multiple chunks in a single slice). In at least one embodiment, storage may be allocated for thin devices in chunks which are each 256 MB or the same size as a slice whereby the size granularity for data movement, thin device allocation and statistics collection may be the same.

In one embodiment, I/O statistics or metrics maintained for slices, or more generally, data portions, of a LUN may reflect I/O activity or I/O workload expressed, for example, in I/Os per second (IOPS). It should be noted that more generally, any suitable I/O statistic may be used to measure the I/O workload of data portions to select which data portions belong on which storage tiers.

In one embodiment in accordance with techniques herein, the data storage optimizer may collect information regarding I/O workload of data portions for one or more time periods and use such information in connection with predicting and modeling I/O workload of the data portions for the next time period. Based on predicted I/O workloads for the data portions, for example, for a next time period N+1, the data storage optimizer may select data portions for placement or movement to different storage tiers. The data storage system may model the movement or placement of the data portions for the next time period N+1 using the predicted I/O workloads for the data portions in order to determine, for example, overall data storage system performance, per storage tier performance, and the like. Based on such modeled or simulated performance of the data storage system, storage tiers, and the like, if a selected set of data portion movements were performed, a decision may be made as to whether to actually implement or perform the modeled data movements or otherwise consider an alternative set of data movements.

Generally, the data storage optimizer (e.g., element 135 of FIG. 3) determines the "temperature" or I/O workload for slices and may, for example, generally relocate those slices having the heaviest or highest I/O workload to the highest performance tiers. Such data movements of slices may include promotions and/or demotions. For example, as described elsewhere herein, a data storage system may have 3 storage tiers ranked, in terms of decreasing relative performance, tier 1 of flash drives, tier 2 of 15K RPM drives and tier 3 of 10K RPM drives. Slices having the highest I/O workload may be selected for movement to the highest performance tiers. For example, a first set of slices having the highest I/O workload may be selected for movement to the flash tier by the data storage optimizer. A second set of slices having the next highest I/O workload may be selected for movement to tier 2. Finally, the remaining slices having the lowest I/O workload are selected for movement to tier 3. Thus, as described elsewhere herein, the data portions may be ranked by the data storage optimizer from highest to lowest in terms of I/O workload or activity using one or more metrics. With physical storage across all storage tiers viewed as a logical continuum from highest to lowest performance tier, data may be placed in the tiers with data portions ranked with the highest workload placed in the highest performance tiers. In this manner, a data portion placed in a particular storage tier may have a workload greater than any data portion placed in any tier ranked lower than the particular storage tier in terms of relative performance.

However, performing processing to implement all such data movements (e.g., promotions and demotions) as determined by the data storage optimizer may generally consume an unacceptably large amount of data storage system resources (e.g., DA processor resources) and may adversely impact data storage system performance. In fact, in some data storage systems, the amount of resources consumed to perform all the data movements determined by the optimizer is so large that the movements are performed infrequently, such as once per day, and may further be performed at off-peak or off-work hours to limit the adverse performance impact experienced by users.

Furthermore, it is noted that the I/O workload of all slices selected for movement by the data storage optimizer is not equal and the impact on performance of moving each slice typically varies. It may be that a large or significant improvement in data storage system performance may be obtained as a result of moving only a subset or percentage of less than all data movements determined by the data storage optimizer.

As a result, described herein are techniques providing a further optimization of which slices to select for data movement or relocation. Such techniques may include a first step of obtaining the list of data movements for slices that the data storage optimizer has determined should be moved or relocated between the various tiers. Such data movements may include promotions and demotions. As a second step, a subset or percentage of less that all data movements on the list is selected for implementation at a point in time. The selected subset may be specifically selected (from all possible candidates on the list) based on criteria, such as those proposed data movements of slices having the highest I/O workload. Rather than relocating all slices on the list, the specifically selected subset or percentage of data movement candidates selected in the second step are implemented and are expected to result in a large significant performance improvement. The expected performance improvement by moving only the specifically selected subset of slices is more than a typical performance improvement that may be otherwise expected if the impact on performance of each candidate or proposed data movement is presumed to be the same. Rather, the impact on performance of each proposed data movement is not the same and the criteria used to rank and thus select the particular slices provides for selecting those particular subset of slices expected to provide the greatest or most significant improvement in performance. For example, by moving or relocating only 20% of the slices selected from the proposed data movements based on the one or more criteria, a performance improvement much greater than 20% is expected. Thus, techniques herein are based on the premise that the impact or improvement in performance is not uniform or equal across all data movement candidates. Additionally, using the criteria (as described elsewhere herein) to rank and thus select the particular slices facilitates identifying and selecting those particular data movement candidates expected to result in the largest or greatest performance improvement with respect to all data movement candidates in the list. The foregoing and other aspects and variations of techniques herein are described in more detail in following paragraphs.

One general behavioral characteristic supporting the foregoing (that selecting a relatively small portion of slices for relocation may result in a large or significant performance improvement) is based on workload skew of the slices under consideration for data movement. The difference or variation in workload across storage tiers may be represented and measured using a skew metric. Skew may be defined as a ratio denoting what cumulative or aggregate percentage (Y %) of I/O activity or workload is directed to what cumulative or aggregate percentage (X %) of the storage capacity of the highest performing storage tiers. Put another way, skew represents that the cumulative or aggregate Y % percentage of the activity is directed to the cumulative or aggregate busiest X % of the data portions (having a capacity of X %) managed by the system where the X % of the data portions are assumed to be the busiest and are placed in the highest performing storage tiers.

Generally, skew provides an indication or measurement regarding how concentrated the workload is for the busiest X % of the data portions. For example, a skew point of 80/20, where Y=80 and X=20, denotes that 80 percent of the activity or workload is directed to 20 percent of the busiest data portions (e.g., wherein the busiest 20% of the data portions having 80% of the workload). For a skew point (X, Y), where X and Y are both percentages, X % may represent a percentage of the cumulative or aggregated amount of physical storage consumed to which the aggregated or cumulative workload Y % is directed. For a given X %, the particular corresponding Y % (denoting the workload or activity directed to the X % of the busiest data) may vary depending on one or more characteristics of the system.

Typically, the workload skew characterizing the I/O workload of a particular set of data slices may be expressed using a single skew point or ratio such as 80/20 noted above or 90/10 (where 90% of the I/O workload is directed to only 10% of the slices or data portions under consideration). In such instances, moving only a small percentage of the slices, such as to ensure that the top ranked 10% or 20% of data slices having the highest I/O workload is stored in the highest ranked flash tier, may result in a significant performance improvement. For example, at a point in time, X=1,000 slices may be selected for movement to the flash tier by the data storage optimizer. Selecting a subset or percentage of less than all the X slices (e.g., such as 20%) for data movement to the flash tier, where the selected subset or percentage of slices are the hottest or have the largest I/O workload of the X slices, may result in a large significant performance improvement. In accordance with techniques herein, the subset including those 20% of the X slices identified as having the highest I/O workload may be relocated or moved rather than relocating all X slices (whereby the expected performance impact of moving only the particularly selected 20% of the X slices is significantly more than 20%).

The foregoing use of I/O workload or temperature of each slice is one example of one or more characteristics or criteria that may be used in connection with selecting a subset or percentage of the set of data movements, where the set may be the set of data movements determined by the data storage optimizer, and the subset or percentage thereof is selected for implementation. In this manner, the set of data movements output by the optimizer may be characterized as proposed data movement candidates. As described elsewhere herein, the set of data movement candidates output by the optimizer may be determined with respect to a time period N. During time period N, I/O statistics are collected and analyzed for the slices in order to determine the I/O workloads for the slices and then accordingly determine the set of proposed data movement candidates in accordance with the I/O workloads for the slices. Subsequently, techniques described herein may then be used to select a percentage or subset of the foregoing set of data movement candidates for implementation. In at least one embodiment, the selected percentage may be implemented at a first point in time with remaining data movement candidates being implemented at one or more subsequent points in time. As a variation, an embodiment may use the percentage, such as 20%, to denote a configurable threshold or maximum percentage of data movement candidate slices that may be selected for data movement at a single point in time (during a time period) to achieve a configurable threshold level T of I/O performance. I/O performance may be expressed, for example, based on average response time (RT) for completing an I/O in the data storage system. T may be expressed in any suitable manner such as, for example, a single RT value, such as a number of milliseconds, or may be expressed as an amount of performance improvement such as a percentage of improvement with respect to an observed average I/O RT without performing the proposed data movements. For example, an embodiment may model the I/O performance expected as a result of moving particular slices or implementing a selected K % of the proposed data movements (the particular slices in the K % being determined based on the one or more criteria noted above, where K %<threshold percentage such as 20%). If the modeled or projected I/O performance T is achieved (e.g., or substantially achieved within some specified tolerance or variation), then the selected K % of the data movements may be implemented at a point in time. If T is not achieved, additional data movement candidates (not to exceed the threshold 20%) may be selected in accordance with the criteria. If T cannot be achieved based on the modeled I/O performance determined as a result of performing up to the threshold 20% of the proposed data movements, then the 20% of the selected proposed data movements may be implemented at a current point in time. Additionally, since T has not been achieved, the foregoing may be repeated at one or more subsequent points in time where, at each point in time, additional selected ones (up to the 20% threshold) of the remaining proposed data movements are implemented at each such point in time. Furthermore, the foregoing may be repeated in an ongoing manner for each time period during which a new set of I/O statics are collected and analyzed and a new set of proposed data movement candidates are accordingly determined by the data storage optimizer.

An embodiment in accordance with techniques herein may consider one or more criteria or characteristics besides I/O workload or "temperature" in connection with selecting the percentage or subset of the data movement candidates for implementation at a point in time. For example, an embodiment may collect I/O statistics for a time period or collection period for each slice where such I/O statistics may include at least the total or cumulative I/O rate or throughput (e.g., number of I/Os (reads and writes) per second directed to each slice). The foregoing may be used to indicate the temperature or I/O workload of each slice in a current time or collection period. Additionally, the cumulative I/O workload for each slice may be determined using the I/O workload information collected for the single current time period N, and additionally, using the current I/O workload as previously determined for each of one or more M time periods prior to N (where a set of I/O statistics may be collected for each of the M time periods in manner similar to time period N). The cumulative I/O workload used in the criteria for each slice may be determined as a weighting of the I/Os directed to the slice during time period N and also each of the M time periods. The weighting may take into consideration how recently I/Os directed to each slice have been received. In such an embodiment, the more recently an I/O is received, the greater weight given to the I/O in determining the cumulative I/O workload for a slice (as used in the criteria in determining slice level I/O workloads). Thus, the weight given to an I/O may deteriorate over time. Techniques for determining such weighted I/O workloads are known in the art. Thus, for each slice, an embodiment may weight multiple average I/O workloads determined for a current time period N for the slice as well as one or more time periods M prior to N, giving greater weight to the I/O workload determined for the most/more recent time or collection periods.

Generally, the following EQUATION 1 may be used to express the revised I/O workload that may be included in the criteria used to rank and select proposed data movement candidates. The revised I/O workload of EQUATION 1 below denotes the I/O workload for a slice S1 determined for a time period N as a weighting of I/O workloads for slice S1.

$$\text{Revised } I/O \text{ workload for slice } S1 \text{ for time period } N) = \quad \text{EQUATION 1}$$
$$I/O \text{ workload for slice } S1 \text{ for time period } N)*$$
$$(W1) + \text{Revised } I/O \text{ workload for slice}$$
$$S1 \text{ for time period } N\text{-}1*(W2)$$

where

"I/O workload for slice S1 for time period N" denotes the I/O workload for slice S1 based only on I/Os directed to slice S1 during the single time period N. The I/O workload may denote the cumulative I/O workload for all reads and writes directed to the slice for time period N;

"W1" denotes a weighting factor applied to the "I/O workload for slice S1 for time period N";

"Revised I/O workload for slice S1 for time period N−1" denotes the revised I/O workload for slice S1 as determined using EQUATION 1 for the previous time period N−1;

"W2" denotes a weighting factor applied to the "Revised I/O workload for slice S1 for time period N−1".

In one embodiment, W1 and W2 may total 100% to thereby denote a relative percentage or weighting of the I/O workload for the slice S1 for the current time period N and the I/O workloads for the slice S1 for time or collection periods prior to N.

In one embodiment in accordance with techniques herein, the data storage optimizer may collect and analyze I/O workload data for each slice once per hour and may additionally determine and output a list each hour that is a relative ranking of proposed slice data movements. At some larger time interval, such as once per day (e.g., once per 24 hour period) or other defined points in time based on a schedule, the data storage optimizer may implement all proposed data movements included on the particular ranked list output at that scheduled point in time. In one embodiment, the list may be ranked based on the revised I/O workload for each slice determined using EQUATION 1. In addition to the foregoing, from the list of proposed data movements as output by the data storage optimizer at each of the smaller hourly times, techniques herein may further rank the proposed data movements based on I/O workload of each slice and any one or more additional desired criteria. The revised ranked list of proposed data movements may generally denote a ranking in terms of priority or criticality with respect to the slices subject to the proposed data movements. For example, using the revised ranked list, a subset of the highest ranked (e.g., most critical or important) data movements may be selected for implementation at a point in time, such as at each smaller time interval of an hour. Thus, in addition to performing all data movements of the list by the data storage optimizer each 24 hours, techniques herein provide for, at each hour or smaller time period at which new I/O statistics are analyzed, selecting a subset of the proposed data movements of the list generated hourly and then implementing or performing the selected subset of data movements at each such hour.

Additionally, it should be noted that an embodiment in accordance with techniques herein may also allow for a user to manually trigger or request performing data movements by the data storage optimizer at other points in time. For example, the data storage optimizer may perform all data movements currently on the list "on demand" (e.g., such as via a user request) in addition to performing such data movements at each scheduled 24 hour time period.

In addition to I/O workload, the criteria or characteristics considered when selecting which particular subset of proposed data movement candidates to implement (e.g., which slices to move) may include one or more characteristics regarding the particular data of each slice. For example, the criteria may include whether the slice includes file system metadata (e.g., identifies where extents of user data of the file is stored, identifies protection or access information regarding users having permission to access the slice data, and the like), and/or may include whether the slice includes data for an application that is deemed a high priority or performance critical application. The relative importance, ranking or criticality of a proposed data movement may be increased if the slice identified as the candidate for data movement includes file system metadata and/or includes data for a high priority or performance critical application. Thus, an embodiment may also consider other criteria besides temperature or I/O workload related aspects of each slice when ranking proposed data movements of slices as output by the data storage optimizer and selecting a subset thereof for implementation.

Generally, an embodiment may use the one or more criteria or characteristics in any suitable manner to rank the set of proposed data movements output by the data storage optimizer and then select a percentage or subset of the highest ranked proposed data movements for implementation.

It should be noted that an embodiment of the data storage optimizer may determine the list of proposed data movements based on I/O workload and additionally considering any tiering policy that may also be applicable. For example, in one embodiment, a tiering policy may include a rule that when determining proposed placement of data and data movements, a threshold amount of physical storage of each tier, such as 10%, should remain free or unused. Thus, when considering, for example, what slices of data should be moved to the flash tier, no more than 90% of the total capacity of flash storage is considered. In a similar manner, a threshold amount of physical storage of each remaining tier may be reserved and not considered consumable when modeling movement of slices.

As noted above, implementing all proposed data movements in the list output by the data storage optimizer may take an unacceptable amount of time and resources to completely implement. For example, the implementation of proposed data movements may be performed once per day for a specified amount of time. It may be that not all proposed data movements are actually implemented in this specified amount of time. Additionally, it may be desirable and beneficial to data storage system performance to implement proposed data movements more frequently.

Thus, in accordance with techniques herein, in at least one embodiment, a subset of the most critical or highest ranked proposed data movement candidates may be selected for implementation more frequently than once per day. For example, a subset of the most critical or highest ranked proposed data movement candidates may be selected for implementation hourly, or more generally, at the same frequency at which I/O statistics are collected each time period. Thus, the revised I/O workload for each slice as determined using EQUATION 1 for each time period may be used in the criteria for ranking and selecting the slices. To further illustrate, in one embodiment, the data storage optimizer may output the list of proposed data movements every hour and may additionally be scheduled to implement all proposed data movements on the list (or as many as possible) at each occurrence of a larger time period, such as each 24 hours. Using techniques herein, the list of proposed data movements output each hour (e.g., smaller time period) may be ranked in accordance with the one or more criteria (including slice-level I/O workload such as determined using EQUATION 1 along with any other desired optional criteria). The ranked list of proposed data movements determined using the one or more criteria may be characterized as denoting ranking of criticality or importance of the proposed data movement candidates. A first subset of the proposed data movements may be selected for implementation at a first point in time T1 where the first subset includes the highest ranked or most critical or most important proposed data movements based on the ranked list. The list may be revised to remove those proposed data movements of the first subset selected for implementation. At a later time T2, such as 1 hour later, a new list of proposed data movements may be output by the optimizer using the latest or most recently collected set of I/O statistics regarding I/O workloads. The list of proposed data movements may be ranked in accordance with the one or more criteria (e.g., including using the latest revised I/O workloads such as determined using EQUATION 1), and a second subset of the proposed data movements of the current list may be selected for implementation. The list may be revised to remove those proposed data movements of the second subset selected for implementation. The foregoing process may be repeated for each hour (e.g., such as at each time period for which a new set of I/O workload statistics are collected) until the occurrence of the larger 24 hour time period at which the optimizer is scheduled to output implement all proposed data movements of the current list. For example, assume the optimizer outputs a new list of proposed data movements every hour and then is scheduled to implement all proposed data movement of the current list each 24 hours. At each hour, the foregoing steps of obtaining revised I/O workloads for slices, determining a list of proposed data movements, ranking the list of proposed data movements in accordance with one or more criteria, selecting a subset of the highest ranked proposed data movements, and implementing the subset may be repeated 23 times, once each hour. Subsequently, at hour 24, processing is performed as noted above of obtaining revised I/O workloads for slices, and determining a list of proposed data movements by the data storage optimizer. Additionally, at hour 24, the data storage optimizer may be scheduled to implement the entire list of proposed data movements. Subsequently, the process may again be repeated for another 24 hour cycle with a new list of proposed data movements output by the data storage optimizer each hour. Additionally, as noted above, an embodiment may also provide for performing data movements which are not scheduled and which may be made on demand or via manual request (e.g., such as issued by a user using data management software executing on management system 22a of FIG. 1). For example, suppose an on-demand manual request is made to have the data storage optimizer implement its current list of proposed data movements at a point in time other than at the regularly scheduled time each 24 hour time period. Assume that the on-demand request is also made between hourly time periods (e.g., where at each hour as noted above, I/O statistics are gathered and analyzed, a new list of proposed data movements is output by the data storage optimizer and ranked using the criteria, a subset of the list is selected and implemented, and the subset of movements performed are removed from the current list). In response to the on-demand request, the remaining data movements on the current list may be implemented.

What will now be described are further aspects of the criteria that may be used in an embodiment in accordance with techniques herein to rank the list of proposed data movements. For example, consider an embodiment which uses criteria for each slice including I/O workload, whether the slice proposed for data movement includes file system metadata, and whether the slice proposed for data movement includes data for a performance critical application. Primary criteria may be specified which includes whether the slice proposed for data movement includes file system metadata, and whether the slice proposed for data movement includes data for a performance critical application. Secondary criteria may be specified which includes the I/O workload for each slice. In such an embodiment, the proposed data movements may be ranked first in accordance with the primary criteria and then in accordance with the secondary criteria.

To further illustrate, reference is made to the example 300 of FIG. 4 which includes a list of proposed data movements (DMs) 310 determined in accordance with techniques herein. The list 310 may be ranked in accordance with the primary and secondary criteria as just described above. The list 310 may include a row of information as may be used in an embodiment in accordance with techniques herein for each slice proposed for data movement in one of the proposed data movements output by the data storage optimizer. Each entry in the ranked list 310 may have a position in the ranked list determined in accordance with the primary and secondary criteria. Each entry in 310 may denote a proposed data movement and may include an indicator 312 identifying whether the affected slice includes file system metadata, an indicator 314 identifying whether the affected slice includes application data of an application that has been characterized (such as through user-specified inputs or configuration) as performance critical, the I/O workload 316 for the affected slice (e.g., as determined using EQUATION 1), and an identifier 318 for the slice of the proposed data movement. DMs 320a-320g denote the particular proposed data movements as ranked in the list where DM 320a denotes the highest ranked data movement and DM 320g denotes the lowest ranked data movement. Based on primary and secondary criteria described above, columns 312 and 314 include indicators of the primary criteria and column 316 includes information of the I/O workload of the secondary criteria. DMs 320a-320d each include an indicator set for one of the primary criteria and DMs 320e-320g do not include an indicator set for one of the primary criteria. Since DMs 320a-d each include one indicator of the primary criteria, the DMS 320a-d are then ranked based on the secondary criteria of I/O workload denoted by column 316 values. The higher the I/O workload, the higher the ranking of the proposed DM. Thus, in this example, assume X1>X2>X3>X4 resulting in the ranking of 320a-d as in the example 300. Since DMs 320e-g do not meet any of the primary criteria, the DMs 320e-g are ranked lower than DMs 320a-d. DMs 320e-g are then ranked based on the secondary criteria of I/O workload denoted by column 316 values. The higher the I/O workload, the higher the ranking of the proposed DM. In this example, assume X5>X6>X7 thereby resulting in the ranking of 320e-g as in the example 300.

Thus, the proposed DMs 320a-g are first ranked based on the primary criteria and then, for a set of DMs equally ranked based on primary criteria, the set is then ranked based on the secondary criteria.

In such an embodiment as described above using criteria as illustrated in determining the ranked list of FIG. 4, each of the primary criteria in 312 and 314 may be equally weighted.

More generally, an embodiment may include more than 2 types of primary criteria each of which may be denoted by a flag or indicator having a binary value as described. In such an embodiment, each of the primary criteria may be equally weighted to determine a total number of indicators of the primary criteria which are set (=yes or applicable) to the slice of the proposed data movement. In this case the proposed DMs may be first ranked based on the total number of primary criteria flags or indicators applicable to each proposed DM slice.

Referring to FIG. 5, shown is an example 400 including a list of proposed data movements 410 that may be determined in an embodiment in accordance with techniques herein. The list 410 may be ranked in accordance with the primary and secondary criteria as just described above. However, the example 400 illustrates a ranked list of proposed DMs 420a-g in accordance with primary criteria including 3 indicators rather than 2 above and including secondary criteria as described above of I/O workload.

The list 410 may include a row of information as may be used in an embodiment in accordance with techniques herein for each slice proposed for data movement in one of the proposed data movements output by the data storage optimizer. Each entry in the ranked list 410 may have a position in the ranked list determined in accordance with the primary and secondary criteria. Each entry in 410 may denote a proposed data movement and may include values for flags or indicators 412, 414 and 415 of primary criteria, the I/O workload 416 for the affected slice (e.g., as determined using EQUATION 1), and an identifier 418 for the slice of the proposed data movement. DMs 420a-420g denote the particular proposed data movements as ranked in the list where DM 420a denotes the highest ranked data movement and DM 420g denotes the lowest ranked data movement. Based on primary and secondary criteria in this example, columns 412, 414 and 415 include indicators of the primary criteria and column 416 includes information of the I/O workload of the secondary criteria. In this example, each of the primary criteria indicators may be weighted equally whereby a total number of flags or indicators set or applicable to the affected slice of each data movement may be determined as follows:

| Data movement | Total number of primary criteria flags set |
|---|---|
| 420a | 3 |
| 420b-d | 2 |
| 420e-g | 0 |

Since DM 420a is the only DM with all 3 primary criteria indicators set, it is ranked first/highest. Since DMs 420b-d each include two indicators of the primary criteria set, the DMs 420b-d are then further ranked based on the secondary criteria of I/O workload denoted by column 416 values. The higher the I/O workload, the higher the ranking of the proposed DM. Thus, in this example, assume X2>X3>X4 resulting in the ranking of 420b-d as in the example 400. Since DMs 420e-g do not meet any of the primary criteria, the DMs 420e-g are ranked lower than DMs 420a-d. DMs 420e-g are then ranked based on the secondary criteria of I/O workload denoted by column 416 values. The higher the I/O workload, the higher the ranking of the proposed DM. In this example, assume X5>X6>X7 thereby resulting in the ranking of 420e-g as in the example 400.

Thus, the proposed DMs 420a-g are first ranked based on the primary criteria and then, for a set of DMs equally ranked based on primary criteria, the set is then ranked based on the secondary criteria. More generally, the primary and/or secondary criteria may each include more than one criterion.

As a variation to the foregoing, rather than have criteria, such as the primary criteria in FIGS. 4 and 5, be equally weighted, an embodiment may associate different weights or priorities with each of the different primary criteria to determine a final primary criteria score. The score may be generally determined as expressed in EQUATION 2 below:

$$\text{Score} = (PC1 * W1) + (PC2 * W2) + (PCn * Wn)$$

where

"Score" is the total score for the primary criteria of a particular proposed data movement; "PC1" through "PCn" denotes the N primary criteria (PC) where each PCi, 1≤i≤N, denotes a different one of the primary criteria and N may generally be an integer greater than 0;

"W1" through "Wn" denotes the weights associated with the N primary criteria (PC) where each Wi, 1≤i≤N, denotes a weight for a corresponding "ith" one of the primary criteria PCi.

In this manner, EQUATION 2 may be used as one way in which different ones of the primary criteria may be given different relative priority or weighting with respect to other ones of the primary criteria. It should be noted that in the same manner, EQUATION 2 may be used to more generally determine a score for any set of criteria, such as primary criteria, secondary criteria, as well as other levels of criteria that may be used in embodiment.

An embodiment in accordance with techniques herein may define a hierarchy of levels of criteria which, as described above may include 2 general levels of criteria—primary and secondary criteria—where each level may include or more criteria. More generally, the levels of criteria may include any suitable number of levels, such as more than 2 levels, each of which includes one or more criteria for that level. To further illustrate, an embodiment in accordance with techniques herein may include 2 levels of criteria, such as any of the primary and secondary criteria as described above in connection with FIGS. 4 and 5. Furthermore, the embodiment may specify a third level of criteria that may be used for the set of proposed DMs having the same position in the ranking based on the primary criteria and the secondary criteria. In such a case, the third level of criteria may be used to further sort or rank the set of proposed DMs.

In one embodiment, the third level of criteria may include an indicator denoting whether the I/O workload directed to the slice of each proposed DM is read heavy or write heavy. For example, the third level of criteria may include an indicator as to whether the I/O workload is more than 50% read or more than 50% write. In such an embodiment, additional I/O statistics may be collected and maintained for each slice which includes a second read I/O workload statistic for reads directed to each slice and a third write I/O workload statistic for write directed to each slice. The foregoing read I/O workload statistic and write I/O workload statistic may be determined for each slice in a manner similar to that as for the cumulative I/O workload for each slice using EQUATION 1. In other words, EQUATION 1 may be applied for use in determining the cumulative I/O workload as noted above, and also determining the foregoing read I/O workload statistic and write I/O workload statistic for each slice. The read I/O workload statistic and write I/O workload statistic for each slice may be used in determining the third level indicator for a slice denoting whether the slice's I/O workload is primarily reads or writes. In one embodiment, the third level indicator may be used in connection with further ranking DMs having the same position in the ranking based on the primary and secondary criteria.

Consistent with discussion elsewhere herein, different classes or tiers of flash-based PDs may have varying endurance levels for writes or erasure cycles as known in the art. The above-noted third level of criteria may be used in an embodiment having multiple tiers of different types of flash PDs. For example, assume an embodiment has 4 storage tiers with relative performance ranking, from highest to lowest, as follows: tier 1 of SLC PDs, tier 2 of MLC PDs, tier 3 of 15K RPM PDs and tier 4 of 10K RPM PDs. In such an embodiment, tier 1 media may be preferred for write heavy I/O workloads. For example, consider ranking a first proposed data movement and a second proposed data movement where both such data movements have the same position in the ranking based on the primary and secondary criteria and both data movements are promotions for slices to tier 1 of SLC PDs. In this case, the proposed data movement which is write heavy may be ranked higher than the remaining proposed data movement which may be read heavy. As a variation, consider ranking a first proposed data movement and a second proposed data movement where both such data movements have the same position in the ranking based on the primary and secondary criteria and both data movements are promotions for slices to tier 2 of MLC PDs. In this case, the proposed data movement which is read heavy may be ranked higher than the remaining proposed data movement which may be write heavy.

Referring to FIG. 6, shown is another example 500 including a list of proposed data movements (DMs) 510 as may be determined in an embodiment in accordance with techniques herein. The list 510 may be ranked in accordance with the primary and secondary criteria as just described above. The list 510 may include a row of information as may be used in an embodiment in accordance with techniques herein for each slice proposed for data movement in one of the proposed data movements output by the data storage optimizer. Each entry in the ranked list 510 may have a position in the ranked listed determined in accordance with primary criteria, secondary criteria and additionally a third level of criteria. Each entry in 510 may denote a proposed data movement and may include an indicator 512 identifying an application priority, an indicator 514 identifying a QOS or quality of service level for the affect slice, the I/O workload 516 for the affected slice (e.g., as determined using EQUATION 1 for cumulative I/O workload of both reads and writes), and an identifier 518 for the slice of the proposed data movement.

Column 512 may identify one of a predefined set of application priorities denoting a priority of the application whose data is stored in a slice of a proposed data movement. For example, in one embodiment having a predefined set of application N (N>0) priorities, 1 may denote the highest priority application and N may denote the lowest application priority. If a particular slice of a proposed data movement includes data for which the application priority is not applicable, a zero may be included in the application priority column 512 for that particular data movement.

Column 514 may identify one of a predefined set of QOS levels denoting a priority or importance of particular slices within a same application whose data is stored in a slice of a proposed data movement. For example, in one embodiment having a predefined set of QOS N levels N being an integer greater than 0), 1 may denote the highest QOS level of slice importance and N may denote the lowest QOS level of slice importance for a particular application.

DMs 520a-520g denote the particular proposed data movements as ranked in the list where DM 520a denotes the highest ranked data movement and DM 520g denotes the lowest ranked data movement. Column 512 may specify the single primary criteria. Column 514 may specify the single secondary criteria. Column 516 may specify the single third level criteria.

DMs 520a-b each include the same primary criteria which is the highest application priority of 1 in column 512 and may therefore be ranked further based on secondary criteria or QOS 514. In this example, DM 520a has a QOS level of 1 which is a higher QOS level than 2 as specified for DM 520*b*. Accordingly, 520*a* is ranked first or highest in the list followed by 520*b*.

Since DMs 520*c-d* each include the same primary criteria which is the application priority of 2 in column 512, DMs 520*c-d* may therefore be ranked further based on secondary criteria or QOS 514. In this example, DM 520*c* and DM 520*d* both have the same QOS level of 1 so processing to ranking the entries further proceeds to examine the third level of criteria as denoted in column 516 for 520*c-d*. The higher the I/O workload, the higher the ranking of the proposed DM list. Thus, in this example, assume X3>X4 resulting in the ranking of 520*c* followed by 520*d* as in the example 500.

Since DMs 520*e-g* each include the same primary criteria which is the application priority of 3 in column 512, DMs 520*e-g* may therefore be ranked further based on secondary criteria or QOS 514. Based on the secondary criteria or QOS level in column 514 for 520*e-g*, the DMs may be accordingly relatively ranked, from highest to lowest, as 520*e*, 520*f*, and 520*g* as illustrated in the example 500.

An embodiment may select a number or amount of the proposed data movements to implement at a point in time using any suitable technique some of which are described herein.

As described herein, an embodiment may use a heuristic, such as based on a particular workload skew for slices under consideration, to determine a number or percentage of proposed data movements to implement at a single point in time. For example, as noted elsewhere herein, the I/O workload of slices for which data movements have been proposed may have an 80-20 workload skew where 80% of the I/O workload may be generally directed to approximately 20% of the slices. In this case, the highest ranked 20% of the proposed data movements may be implemented at each point in time, such as each time period (e.g., hourly) during which I/O statistics are collected and then revised I/O workloads (e.g., using EQUATION 1) are calculated.

Rather than specify a particular amount or percentage of proposed data movements to implement each time period (such as each time period when revised I/O statistics are collected and determined), an embodiment may alternatively take an incremental approach and implement proposed data movements, in order of highest to lowest ranking in the list (where the ranking is determined in accordance with the one or more criteria), until a specified performance level has been obtained or until a specified amount of performance improvement (e.g., such as decrease in average I/O response time) has been achieved. In one embodiment, modeling may be used to determine the expected performance if selected proposed data movements are implemented. In such an embodiment, modeling may be used to determine the number of proposed data movements to subsequently implement to obtain a specified level of performance, specified level of performance improvement (e.g., percentage of improvement in performance with respect to a current observed average I/O RT), and the like. As an alternative, an embodiment may incrementally implement sets of proposed data movements, measure the observed actual performance and determine whether to implement additional proposed data movements for a current time period based on the actual observed performance.

As yet another variation, an embodiment may select a number of proposed data movements to implement based on a time limit consumption. For example, each hour, proposed data movements may be selected from the ranked list, with highest ranking proposed data movements being selected prior to any lower ranked proposed data movement, as described above. The number of proposed data movements actually performed or implemented may be subject to a time limit consumption, such as 5 minutes of wall clock time. Once the 5 minute time limit is reached for one hour, processing in accordance with techniques herein may stop and then resume at the next scheduled hour for another 5 minutes. In this manner, the number of proposed data movements implemented is whatever number can be implemented during each 5 minute time period per hour.

As yet another variation, an embodiment may select for implementation at each time period, such as each hour, all proposed data movements of the current list having a specified level of criticality in the ranked list of proposed data movements. For example, with reference back to FIG. 4, an embodiment may select for implementation in each time period (e.g., each hour), all proposed data movements meeting any one of the specified primary criteria denote in columns 312 and 314. In this manner, all proposed data movements to move slices containing rather file system metadata or application critical data may be implemented each time period, such as each hour denoting a new statistics collection and analysis period and each hour denoting a time period when the data storage optimizer may output a new revised list of proposed data movements taking into account the most recent/current set of workload data for the current time period. As another example, with reference back to FIG. 6, an embodiment may select for implementation in each time period all proposed data movements of the current list having at least a specified minimum application priority as denoted in column 512 (e.g., all proposed data movements with an application priority of 1, or all proposed data movements of the current list with an application priority of at least (e.g., 1 or 2)).

In this manner, the amount of proposed data movements implemented each time period (e.g., such as each hour denoting a new statistics collection and analysis period and also denoting each time period at which a new list of data movements is determined (based on the new/latest statistics collect) is based on criteria denoting at least a threshold level of criticality.

Figure 7:
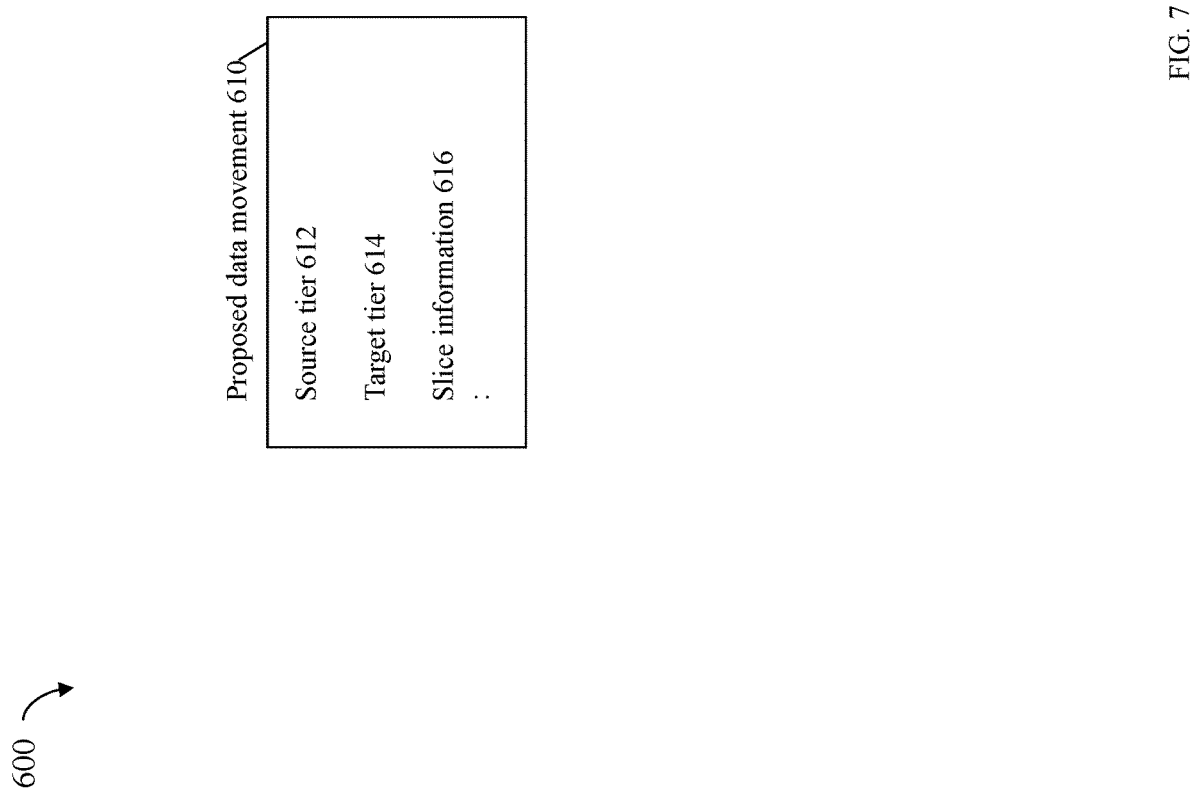
FIG. 7 is an example illustrating additional information that may be specified for each proposed data movement determined by the data storage optimizer in an embodiment in accordance with techniques herein.

Referring to FIG. 7, shown is an example 600 of information that may be output by the data storage optimizer for each proposed data movement 610. For each proposed data movement 610 determined by the data storage optimizer, information output by the data storage optimizer may include, for example, the source tier 612 (currently including the slice for which the data movement is proposed), the target tier 614 (denoting the target tier to which the slice would be moved if this proposed data movement 610 is implemented), and slice information 616. The slice information 616 may identify the particular slice of data to be moved (e.g., LUN and LBA, current physical device location such as storage pool, location in the pool, and the like). The information of the example 600 for each proposed data movement may be used with techniques herein in addition to the information generally described and illustrated in FIGS. 4-6.

Figure 8:
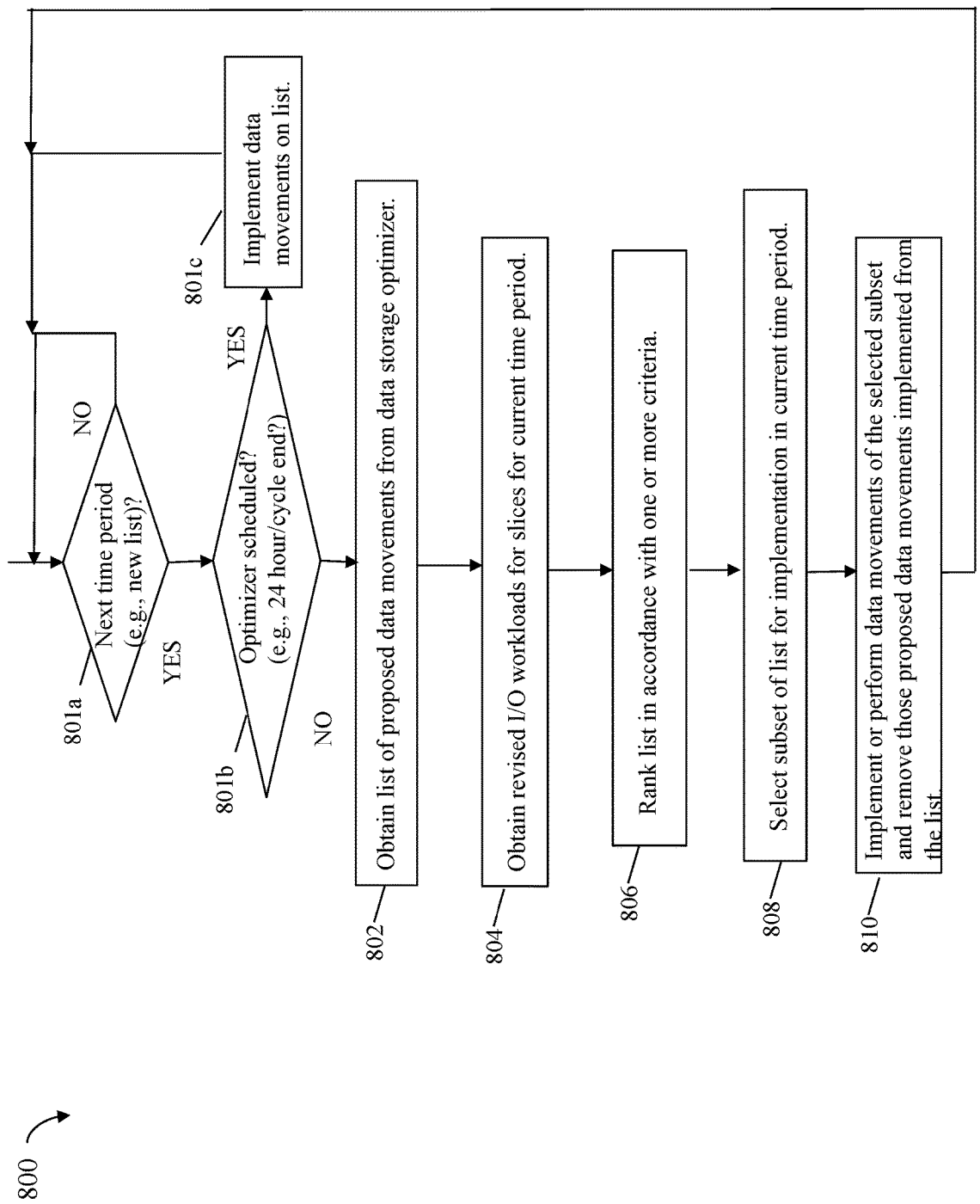
FIGS. 8 and 9 are flowcharts of processing steps that may be performed in an embodiment in accordance with techniques herein.

Referring to FIG. 8, shown is a flowchart of processing steps that may be performed in an embodiment in accordance with techniques herein. The flowchart 800 generally summarizes processing described above. At step 801*a*, a determination is made as to whether a next occurrence of a new time period has arrived. For example, as noted above, a time period may be an hour whereby each hour ends another time period during which a new set of I/O workload information or statistics are obtained and also ends another time period at which the data storage optimizer outputs a new list of proposed data movements based on current revised I/O workload information that takes into account the most I/O workload information just obtained for the current time period just ended. Control remains at step 801*a* until step 801*a* evaluates to true or yes. Upon step 801*a* evaluating to yes, control proceeds to step 801*b* where a determination is made as to whether the optimizer is scheduled to perform the list of data movements at the current time period. For example, as described above, a new list of data movements may be obtained each hour and the optimizer may be scheduled to implement or perform the list of data movements at each occurrence of a larger time interval, such as an integer multiple of the smaller time periods. For example, the current list of proposed data movements may be scheduled for implementation each day or every 24 hours where 24 hours may denote a scheduled cycle time at which the current list of proposed data movements is scheduled for implementation. If step 801*b* evaluates to yes, control proceeds to 801*c* to implement the data movements on the current list (e.g., latest list output as a result of step 801*a*). From step 801*c*, control proceeds to step 801*a*.

If step 801*b* evaluates to no, control proceeds to step 802. At step 802, a list of proposed data movements may be obtained from the data storage optimizer. As described above, a new list may be obtained, for example, each hour. At step 804, revised I/O workloads (e.g., cumulative I/O workloads such as using EQUATION 1) may be obtained for the current time period for the slices of the proposed data movements in the current list. The time period of step 804 may be, for example, every hour denoting the end of a current data or I/O statistics collection and analysis period. At step 806, the list may be ranked in accordance with one or more criteria. At step 808, a subset of the proposed data movements of the list may be selected for implementation in the current time period. The subset selected may be those proposed data movements ranked highest in the list. At step 810, the selected subset of proposed data movements may be implemented or actually performed. Additionally, the list of proposed data movements may be revised or updated to remove from the list those proposed data movements just implemented for the current time period. The particular number of proposed data movements selected and implemented in steps 808 and 810, respectively, may vary with embodiment and may be determined using any suitable technique some of which are described herein. From step 810, control proceeds to step 801*a*.

Consistent with discussion above, in at least one embodiment, a time period may denote an amount of time, such as 1 hour, where at each occurrence of the time period ending, the data storage optimizer may end a current I/O workload or statistics collection time period and may determine a list of proposed data movements in accordance with I/O workloads of the slices. The I/O workload may include the current I/O workloads for the slices for the latest time period ending. A cycle may denote a time interval larger than the single time period where at each cycle time, the data storage optimizer may be scheduled to implement the current list of proposed data movements. For example, as described herein, the data storage optimizer may generate a new list of proposed data movements each hour and may be scheduled to implement the current list each one day cycle. Within each cycle, such as each 24 hour time period of a day, there may be multiple time periods or instances at which I/O statistics are collected and analyzed and at which a new list of proposed data movements is determined. In one embodiment, such collection and analysis of I/O statistics may occur every hour denoting a new time period as described in connection with FIG. 8 processing. Additionally, each time period, a subset of the proposed data movements of the current list may be selected for implementation based on the ranked list of proposed data movements (where the ranking is determined in accordance with one or more criteria).

Figure 9:
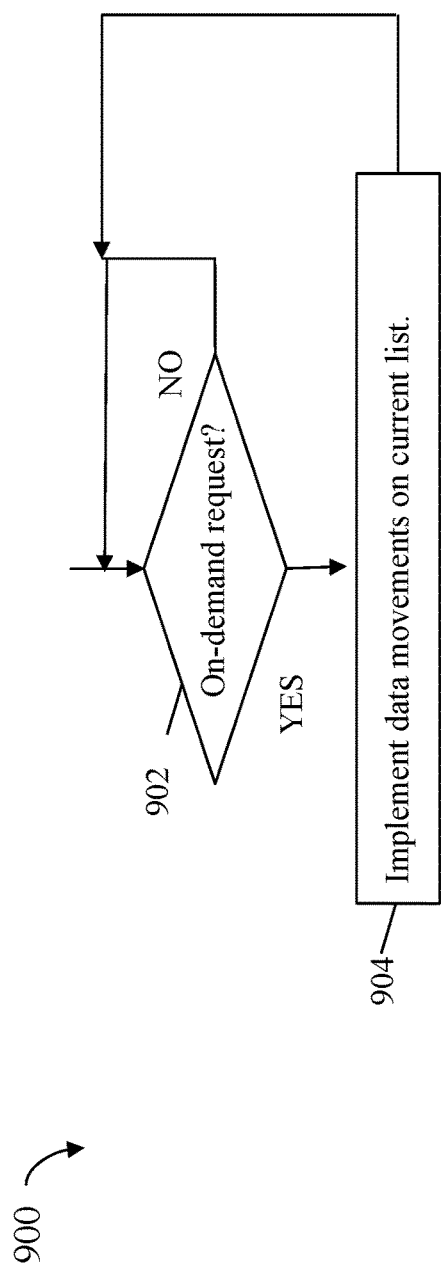

Referring to FIG. 9, shown is a flowchart 900 of processing steps that may be performed in connection with on-demand requests for data movements in an embodiment in accordance with techniques herein. The flowchart 900 includes processing steps that may be performed, for example, in connection with a user manually requesting to perform data movements by the data storage optimizer at a point in time which is not scheduled. At step 902, a determination is made as to whether an on-demand request has been received. Control remains at step 902 until such a request is received. Responsive to step 902 evaluating to yes, control proceeds to step 904 where the data movements currently on the list may be implemented. Control then returns to step 902. The on-demand request may be received in step 902, for example, at a point in time between two hourly time periods A and B at which the data storage optimizer outputs a new list of proposed data movements. As such, step 904 may include performing the proposed data movements remaining on the current list after removal of the subset of data movements implemented at time period A. For example, step 810 of FIG. 8 may be performed as processing for time period A whereby a revised list is generated as a result of step 810 processing that removes the subset of data movements implemented in step 810. Prior to performing processing steps of FIG. 8 for time period B, an on-demand request is received in step 902 whereby the revised list of proposed data movements from time period A is then implemented in step 904. Subsequently, the next time period B ends where processing steps of flowchart 800 are repeated for time period B using a new list of proposed data movements output by the data storage optimizer.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data movement optimization processing comprising:

receiving, using a processor, a list of proposed data movements for a plurality of data portions, wherein each proposed data movement of the list denotes a proposed movement of a data portion of the plurality of data portions from a source storage tier of a plurality of storage tiers to a target tier of the plurality of storage tiers, wherein the plurality of storage tiers are used for back-end data storage in a data storage system, and wherein each proposed data movement of the list denotes either a demotion, where the source storage tier is a higher performance tier than the target storage tier, or a promotion, where the source storage tier is a lower performance tier than the target storage tier;

ranking, using a processor, the list of proposed data movements in accordance with one or more criteria associated with each of the proposed data movements of the list, wherein the one or more criteria for said each proposed data movement includes at least one characteristic about said each proposed data movement other than I/O workload directed to the data portion of said each proposed data movement, wherein the one or more criteria for said each proposed data movement, that moves the data portion to the target storage tier, includes an indicator denoting whether the data portion includes file system metadata, wherein the file system metadata includes protection or access information indicating user permissions needed to access different data portions;

selecting, using a processor and in accordance with said ranking, a subset of the proposed data movements of the list, wherein the subset of the proposed data movements of the list is determined using a workload skew point denoting that a specified percentage of I/O workload of the plurality of data portions is directed to a specified percentage of busiest data portions of the plurality of data portions;

implementing, using a processor, the subset of the proposed data movements by performing each of the proposed data movements of the subset;

and revising, using a processor, the list to remove the subset of the proposed data movements implemented in said implementing.

2. The method of claim 1, wherein the plurality of storage tiers are ranked based on performance.

3. The method of claim 2, wherein the list of proposed data movements is generated by a data storage optimizer that automatically generates a new list of proposed data movements at each occurrence of a defined time period.

4. The method of claim 3, wherein said ranking, said selecting, said implementing and said revising are repeated as a group at each occurrence of a defined time period within a cycle, wherein the cycle has a defined cycle time that is a multiple of the defined time period.

5. The method of claim 1, wherein the one or more criteria include one or more primary criteria and one or more secondary criteria, and wherein each proposed data movement of the list meeting the one or more primary criteria is ranked higher by said ranking than any other proposed data movement of the list not meeting the primary criteria.

6. The method of claim 1, wherein the one or more criteria includes a third level of criteria.

7. The method of claim 1, wherein the one or more criteria for said each proposed data movement, that moves the data portion to the target storage tier, includes an indicator denoting whether the data portion includes application critical data.

8. The method of claim 1, wherein the one or more criteria for said each proposed data movement, that moves the data portion to the target storage tier, includes an I/O workload for the data portion.

9. The method of claim 8, wherein the I/O workload for the data portion denotes a cumulative I/O workload directed to the data portion for both reads and writes directed to the data portion.

10. The method of claim 1, wherein the one or more criteria for said each proposed data movement, that moves the data portion to the target storage tier, includes one of a predefined set of application priorities denoting an application priority for an application using the data included in the data portion of said each proposed data movement.

11. The method of claim 1, wherein the one or more criteria for said each proposed data movement, that moves the data portion to the target storage tier, includes one of a predefined set of quality of service levels denoting a priority or a level of importance of the data portion of said each proposed data movement, wherein the priority or the level of importance of the data portion of said each proposed data movement is with respect to an application using the data included in the data portion of said each proposed data movement.

12. The method of claim 1, wherein a first of the plurality of storage tiers includes physical storage devices having a first write endurance and a second of the plurality of storage tiers includes physical storage devices having a second write endurance greater than the first write endurance.

13. The method of claim 12, wherein the first endurance denotes that physical storage devices of the first storage tier wear out and are expected to sustain an expected number of write or erasure cycles that is less than a second expected number of write or erasure cycles associated with physical devices of the second storage tier.

14. The method of claim 13, wherein the first and the second storage tiers are tiers of different flash-based physical drives.

15. The method of claim 14, wherein the one or more criteria for said each proposed data movement, that moves the data portion to the target storage tier, includes an indicator denoting whether I/O workload directed to the data portion is read heavy or write heavy.

16. The method of claim 1, wherein the subset of the proposed data movements is further determined using a specified increase in performance expected as a result of modeling implementation of a number of the proposed data movements of the list as ranked by said ranking.

17. A system comprising:
one or more processors;
and one or more memories comprising code stored thereon that, when executed, performs a method comprising:
receiving, using a processor, a list of proposed data movements for a plurality of data portions, wherein each proposed data movement of the list denotes a proposed movement of a data portion of the plurality of data portions from a source storage tier of a plurality of storage tiers to a target tier of the plurality of storage tiers, wherein the plurality of storage tiers are used for back-end data storage in a data storage system, and wherein each proposed data movement of the list denotes either a demotion, where the source storage tier is a higher performance tier than the target storage tier, or a promotion, where the source storage tier is a lower performance tier than the target storage tier;
ranking, using a processor, the list of proposed data movements in accordance with one or more criteria associated with each of the proposed data movements of the list, wherein the one or more criteria for said each proposed data movement includes at least one characteristic about said each proposed data movement other than I/O workload directed to the data portion of said each proposed data movement, wherein the one or more criteria for said each proposed data movement, that moves the data portion to the target storage tier, includes an indicator denoting whether the data portion includes file system metadata, wherein the file system metadata includes protection or access information indicating user permissions needed to access different data portions;

selecting, using a processor and in accordance with said ranking, a subset of the proposed data movements of the list, wherein the subset of the proposed data movements of the list is determined using a workload skew point denoting that a specified percentage of I/O workload of the plurality of data portions is directed to a specified percentage of busiest data portions of the plurality of data portions;

implementing, using a processor, the subset of the proposed data movements by performing each of the proposed data movements of the subset;

and revising, using a processor, the list to remove the subset of the proposed data movements implemented in said implementing.

18. A non-transitory computer readable medium comprising code stored thereon, that when executed, performs a method of data movement optimization processing comprising:

receiving, using a processor, a list of proposed data movements for a plurality of data portions, wherein each proposed data movement of the list denotes a proposed movement of a data portion of the plurality of data portions from a source storage tier of a plurality of storage tiers to a target tier of the plurality of storage tiers, wherein the plurality of storage tiers are used for back-end data storage in a data storage system, and wherein each proposed data movement of the list denotes either a demotion, where the source storage tier is a higher performance tier than the target storage tier, or a promotion, where the source storage tier is a lower performance tier than the target storage tier;

ranking, using a processor, the list of proposed data movements in accordance with one or more criteria associated with each of the proposed data movements of the list, wherein the one or more criteria for said each proposed data movement includes at least one characteristic about said each proposed data movement other than I/O workload directed to the data portion of said each proposed data movement, wherein the one or more criteria for said each proposed data movement, that moves the data portion to the target storage tier, includes an indicator denoting whether the data portion includes file system metadata, wherein the file system metadata includes protection or access information indicating user permissions needed to access different data portions;

selecting, using a processor and in accordance with said ranking, a subset of the proposed data movements of the list, wherein the subset of the proposed data movements of the list is determined using a workload skew point denoting that a specified percentage of I/O workload of the plurality of data portions is directed to a specified percentage of busiest data portions of the plurality of data portions;

implementing, using a processor, the subset of the proposed data movements by performing each of the proposed data movements of the subset;

and revising, using a processor, the list to remove the subset of the proposed data movements implemented in said implementing.

19. The non-transitory computer readable medium of claim 18, wherein the subset includes a highest ranked portion of proposed data movements on the list, wherein the revising step outputs a revised list of proposed data movements in which the subset implemented have been removed, and, after performing said revising, the method further includes performing:

receiving an on-demand request to perform data movements; and responsive to receiving the on-demand request, implementing the revised list of proposed data movements.

20. The non-transitory computer readable medium of claim 18, wherein the subset of the proposed data movements is further determined using a specified increase in performance expected as a result of modeling implementation of a number of the proposed data movements of the list as ranked by said ranking.

* * * * *